Patented Sept. 7, 1937

2,092,050

UNITED STATES PATENT OFFICE 2,092,050

COMPOSITION AND METHOD FOR JOINING SURFACES

Percy Morgan Clark, Parlin, and Thomas T. Taylor, New Brunswick, N. J., assignors to E. I. du Pont de Nemours & Company, Wilmington, Del., a corporation of Delaware No Drawing. Application April 27, 1935, Serial No. 18,510

2 Claims. (Cl. 154—40)

This invention relates to improvements in the joining together of surfaces with cellulose derivative cements or adhesives, and more particularly to the joining of shoe parts with cellulose derivative adhesives as, for example, leather soles to shoe uppers.

Standard practice for the manufacture of shoes in which the soles are joined to the uppers by means of adhesives, provides for the application of a suitable adhesive to designated areas of the shoe parts to be joined such as, for example, to the over-lasted edge of the shoe upper and to a limited area along the edge of the shoe sole. The adhesive is permitted to dry in order to allow safe storage of the materials to which the adhesive has been applied until such time as it is convenient or desired to finally join the parts. Immediately preceding the assembling of the adhesive coated parts, the dried adhesive is activated or softened by the application of a suitable activator or solvent or a combination of such materials. The volatility of this activator is so adjusted as to allow ample time for assembly of shoe parts by the operator before placing in the pressure device commonly used and which is necessary in order that an acceptable bond between the two parts be secured.

In present practice, this activator or softener, in order to meet certain necessary basic requirements, is of such character as to retard the desired speed in production because of the excessive time necessary for the parts to remain in the pressure device to permit substantially complete removal of the volatile adhesive softener or until the adhesive has set completely. Attempts have been made to reduce this time period by the use of more volatile activators or softeners but these have not met with material success, since too high a volatility of the ordinary softener does not allow sufficient time for the operator to make proper assembly of the shoe parts before placing them in the pressure device. This expedient, therefore, has not furnished a solution to the problem since an inferior and unacceptable bond between the component parts has resulted from such attempted modifications.

This invention has as an object the provision of an improved method of adhering surfaces together where the adhesive previously applied has been allowed to dry prior to bringing the surfaces together for assembly.

A further object of the invention is the provision of an improved activator or softener for the dried adhesive, which, on account of its unusual and peculiar characteristics, allows sufficient time for assembling the adhesive coated parts and yet affords substantial reduction in drying time after the parts have been assembled in the pressure device.

A still further object of the invention is the provision of a cellulose derivative adhesive activator or softener which possesses unusual solvent or penetrating power thereby providing more uniform and complete penetration throughout the adhesive film, thus insuring a strong bond between the two surfaces to be joined.

A still further object is the provision of an activator which will have non-staining properties, and more particularly an activator for a dried cellulose derivative adhesive used for joining soles to light colored uppers.

In the past the cement softeners which were commonly used frequently caused undesirable staining of the shoe parts, an effect which was particularly troublesome in connection with white fabric or light colored suede uppers. The ingredients of the softeners apparently extracted the tannin and other colored matter from the leather sole and carried it into the upper by wicking or capillary action. It has been found that propylene oxide is of particular advantage in this respect. When used alone in softening the hardened cement, there is no staining of the leather and when used in combination with other cement solvents which in themselves tend to extract the tannin, the staining tendency is proportionately reduced.

Other objects will be apparent from the following description of the invention.

These objects are accomplished by the use of propylene oxide, essentially, alone or in combination with other volatile materials as an activator or softener for the dried and hardened cellulose derivative type adhesives.

To illustrate the desirable properties possessed by propylene oxide when used as an activator or softener for dried adhesive, the following results obtained from tests on the material in comparison with other materials used for the same purpose, are noted:

A cellulose derivative adhesive of the following composition was prepared:

| | Per cent |
|---|---|
| Cellulose nitrate | 16.0 |
| Denatured ethyl alcohol | 5.5 |
| Camphor | 3.0 |
| Dibutyl phthalate | 1.0 |
| Methyl acetone | 74.5 |
| | 100.0 |

The cellulose nitrate used in the composition had a viscosity characteristic of 16 seconds, and a nitrogen content of 12.3%. This composition was cast into a film on a glass plate so as to yield a film of final thickness of 0.005 inch. After being thoroughly dried, the film was removed from the glass plate and cut into suitable size pieces for the tests which were made with a series of volatile solvents or activators. The test which is designated as a penetration test was carried out by placing a suitable size piece of dried adhesive film on the surface of a felt pad saturated with the solvent being tested, and rubbing the finger very lightly but continuously over the cement film surface. In order to reduce solvent loss to a minimum, the felt pad was placed in a semi-closed container. The endpoint of the test was taken as the time for penetration of the solvent through the film which was determined as the point at which the solvent had softened the dry adhesive film sufficiently to give a soft, tacky surface, easily detected by the finger. The result of tests obtained on various solvents or activators are noted as follows:

|  | Seconds |
| --- | --- |
| Propylene oxide | 15 |
| Acetone | 19 |
| Methyl acetone | 23 |
| Ethyl acetate | 29 |
| Methanol 99% | 44 |
| Butyl acetate | 50 |
| Ethylene glycol monoethyl ether | 90 |

Activators or softeners for dried or hardened adhesives are frequently prepared by mixing materials having different volatilities in order to provide maximum speed of drying while the parts are in the pressure device, without reducing the time allowed for assembly of the parts to a point which prohibits the proper initial joining of the parts. In addition to tests on individual materials as noted above, two mixtures of the commonly used type just described were tested with the following results as to penetration time:

|  | Penetration time 27 seconds |
| --- | --- |
| Acetone | 90% |
| Ethyl acetate | 10 |
|  |  |
| Isopropyl acetone | 79% |
| Ethyl acetate | 16 |
| Butyl acetate | 5 |

An examination of the results of these tests shows definitely the superiority of propylene oxide when used alone as an activator or softener for the dried adhesive.

It has been found that propylene oxide may be used as an activator alone or where a slower evaporating activator is desired the propylene oxide may be combined with other solvents or activators for the adhesive to meet the required time schedule established for any individual set of conditions.

As an example of a suitable combination, a mixture of propylene oxide 90% and acetone 10% has been found to yield effective results. Penetration time for this composition is found to be between 16 and 17 seconds. Other combinations may be prepared by using the propylene oxide with one or more other solvents as, for example, acetone, methyl acetone, ethyl acetate, methanol, butyl acetate and ethylene glycol monoethyl ether. However, such combinations are not limited only to the solvents noted but any satisfactory solvent for the adhesive may be used. In order to take advantage of the desirable properties of propylene oxide, it should be present in any combination in preponderant amounts.

In using propylene oxide as the activator or solvent either alone or in combination with other solvents, no substantial departure from standard operating practice is necessary. When the parts coated with the hardened or dried cement are to be finally assembled, softener is applied in a prescribed manner such as by brushing or swabbing, by mechanical means such as by a jet or spray or in any other suitable manner so that the cement area is uniformly treated with the propylene oxide or mixture containing propylene oxide. The individual parts can be immediately assembled and placed in a pressure device commonly used in the manufacture of cemented shoes and held in the device for such a time as is necessary for the cement to set. Such a result depends upon substantially complete elimination of the activator or solvent from the cement layer through evaporation or absorption by the leather.

It is believed that the very desirable results obtained in using propylene oxide as a softener for hardened cement are due in the main to its very great solvent power. This high solvency action provides better penetration into and throughout the body of the hardened cement, thereby insuring more uniform and thorough activation of the film to which it is applied. This greater penetration also assists in retaining sufficient softener in the body of the cement to afford ample time for the placing and initial joining of the cement coated parts prior to placing the assembly in the pressure device. This may probably be ascribed to the rapid penetration of the solvent into the body of the cement as contrasted to a softener of lower solvent power but equivalent volatility which would remain largely on the surface and be so rapidly dissipated that insufficient softening of the cement film would take place and an imperfect joint secured when placed in the pressure device. Thus the property of great penetration also regulates in a desirable manner the volatilization rate of the softener during one of the very vital steps of the operation.

The invention finds particular adaptability in the manufacture of shoes or for joining shoe parts such as soles to shoe uppers. The invention is also applicable in the manufacture of leather belts such as are used for industrial power transmissions, for joining celluloid objects, motion picture film, lacquered paper or moistureproof regenerated cellulose, cellulose acetate wrapping materials, etc. Because of the very satisfactory results obtained, other applications of propylene oxide as an activator or softener for dried or hardened cement film will readily occur to those skilled in the art.

The unusual solvent power of propylene oxide affords desired penetrating properties when used in activating hardened cellulose derivative cements not heretofore available in the generally used activators or solvents. The unusual penetrating power of the propylene oxide provides a more uniform and thorough activation of the hardened cement film than has been possible in the past.

The greater penetration of the activator in the dried cement film also has an advantage in that the solvent is retained in the body of the cement for a longer period than when an activator of lower solvent power which remains substantially on the surface, is used. The retention of such a highly volatile solvent is desirable during the initial step of the shoe cementing process prior to placing the parts in a pressure device, since ample time is permitted for suitably joining the cement coated parts. However, upon being placed in the pressure device the highly volatile activator is dissipated with such rapidity as to greatly reduce the time required to secure a satisfactory bond in the pressure device which, of course, is of marked advantage from a production standpoint. Because of the greater solvent and penetrating power of propylene oxide a stronger and more effective bond is secured since there are no areas of the hardened cement which are only partially softened as is often the case when activators of the present practice are used.

It is apparent that many widely different embodiments of this invention may be made without departing from the spirit and scope thereof and, therefore, it is not intended to be limited except as indicated in the appended claims.

We claim:

1. Improvement in the method of joining surfaces which comprises applying cellulose derivative adhesive to at least one of the surfaces to be joined, allowing the adhesive to harden, activating the hardened adhesive on at least one of the surfaces by applying thereto a completely volatile liquid activator consisting of approximately 90% propylene oxide and approximately 10% of a solvent selected from the group consisting of acetone, ethyl acetate, butyl acetate, methyl acetate, methanol, and ethylene glycol mono-ethyl ether, and immediately thereafter joining the said surfaces by applying pressure.

2. Process of claim 1 in which the activator consists of propylene oxide and acetone.

PERCY MORGAN CLARK.
THOMAS T. TAYLOR.